Dec. 16, 1958 G. J. FEDERIGHI ET AL 2,864,387
DISHWASHING MACHINE WITH AUTOMATIC FINAL RINSE CONTROL
Filed March 29, 1954 2 Sheets-Sheet 1
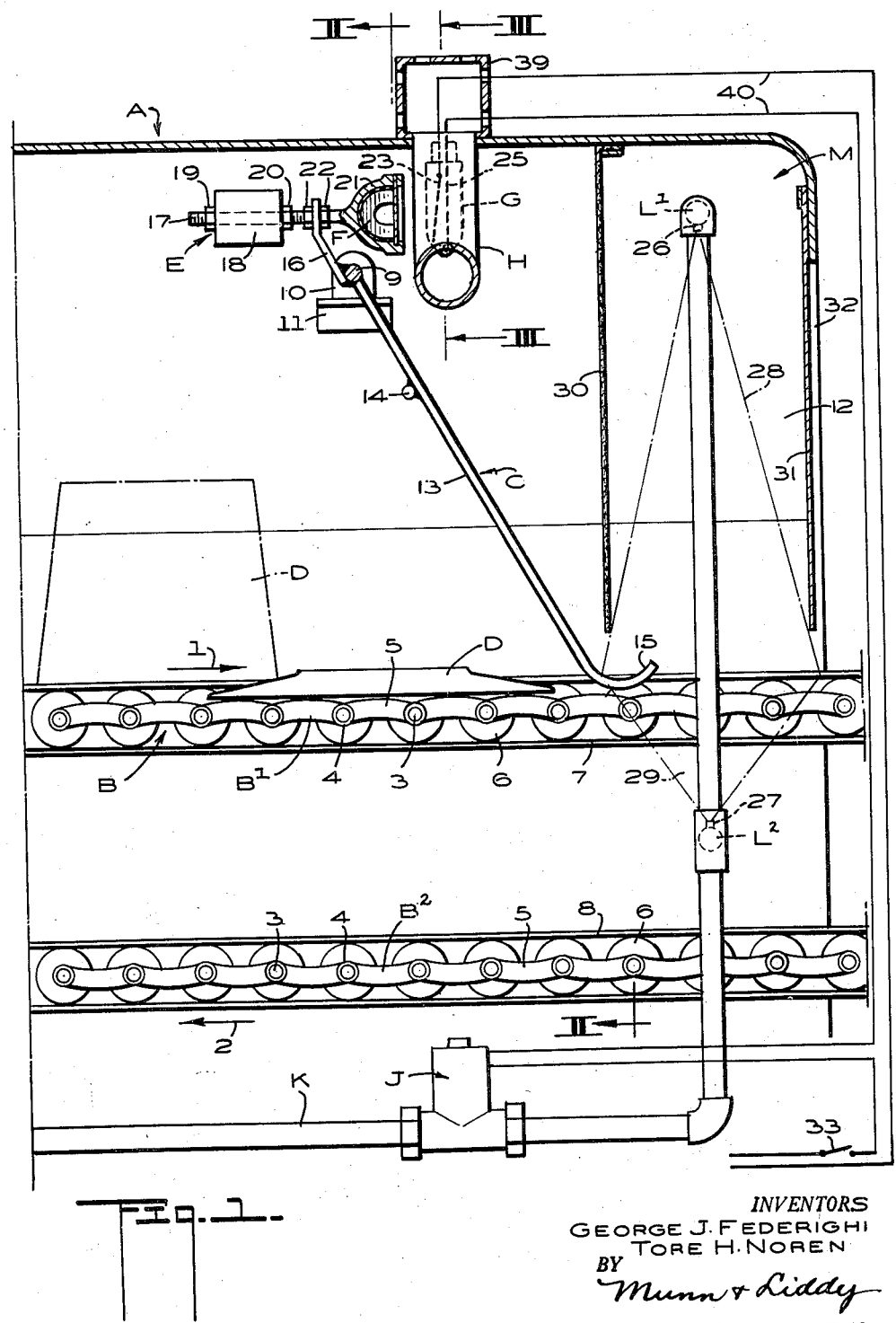
INVENTORS
GEORGE J. FEDERIGHI
TORE H. NOREN
BY
Munn + Liddy
ATTORNEYS

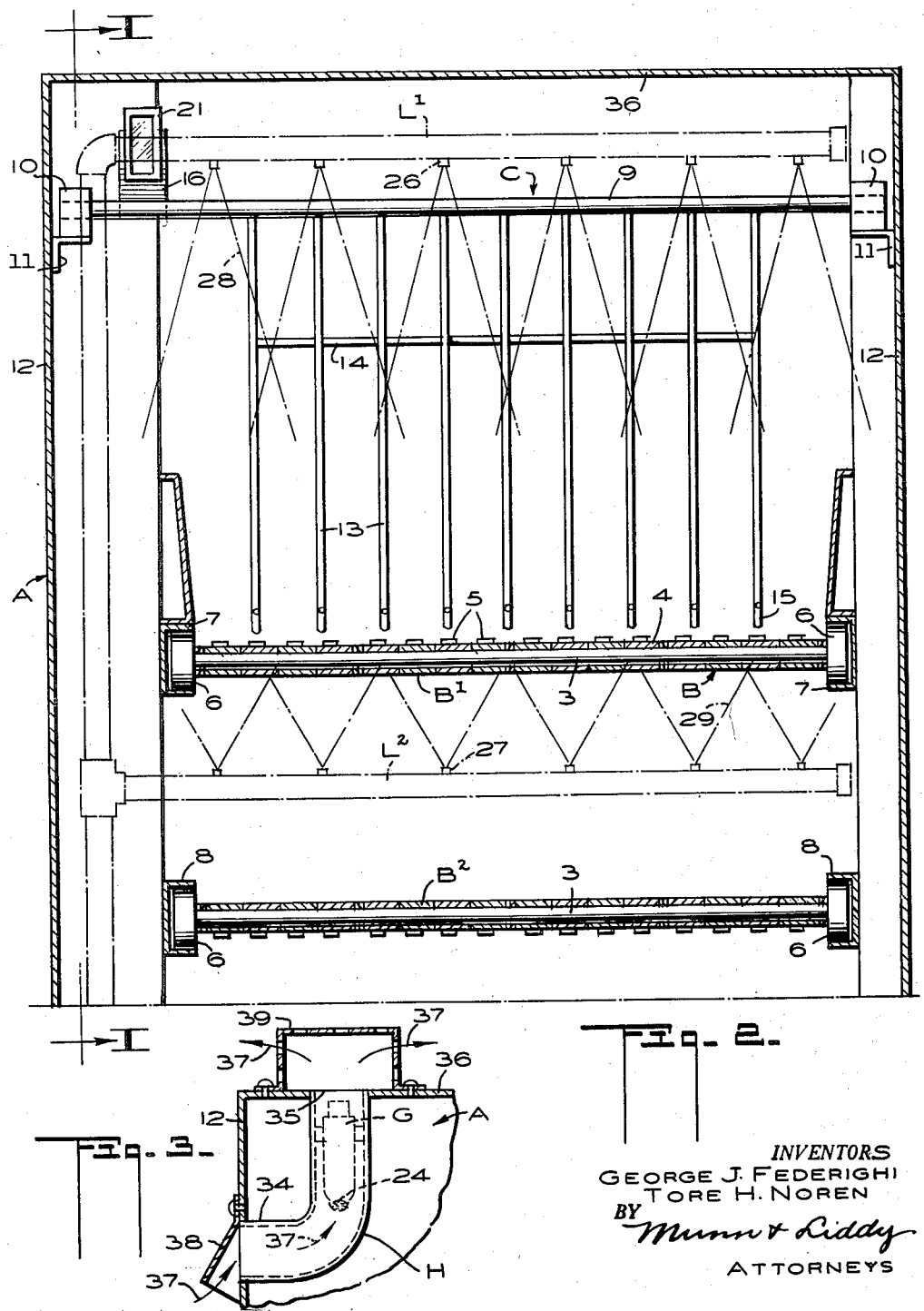

United States Patent Office 2,864,387
Patented Dec. 16, 1958

2,864,387

DISHWASHING MACHINE WITH AUTOMATIC FINAL RINSE CONTROL

George J. Federighi and Tore H. Noren, San Francisco, Calif.

Application March 29, 1954, Serial No. 419,236

2 Claims. (Cl. 134—46)

In our joint patent on a Magnetic Mechanism for Controlling Flow of Rinse Water in a Dish-Washing Machine, Patent No. 2,668,548, issued February 9, 1954, we disclose a dish washing machine that has means for moving a dish-carrying basket through a dish washing compartment and one or more dish-rinsing compartments. A mercury switch is mounted outside of the dish washing machine and a trip is mounted within the machine and is actuated by the dish-carrying basket and carries a magnet for controlling the opening and closing of the mercury switch. When the trip is in normal position, the magnet is disposed close to the mercury switch for maintaining it open. An electrically operated rinse water valve is connected to the switch and remains closed so long as the switch remains open.

The electric valve is placed in the hot water supply line that leads to the final rinse compartment in the machine. It is vital that the final rinse water be turned on only when there are dishes in position to be given their final rinse, otherwise there is an unnecessary waste of hot water and the washing water will become diluted. A tray of dishes would actuate the trip in our patented invention only when they were in a position to receive the rinse water and then the trip would swing the magnet away from the mercury switch and permit the latter to close. The closing of the switch would open the electric valve that controls the flow of the final rinse water.

The problem solved in our patent was the placing of the hot water rinse valve and the mercury switch to operate the valve, outside of the dish washing machine and the mounting of the trip and the magnet for the switch, within the machine, while still causing the switch to be actuated when the trip was moved by a tray of dishes contacting therewith.

In the present invention, a dish washing machine is used that has an endless conveyor for carrying the dishes and other objects to be washed, through the washing and rinsing compartments of the machine. Dish trays are not used and articles to be washed are placed directly on the upper reach of the endless conveyor. Novel means is used for automatically turning on the final rinse water only when the articles have been washed and enter the compartment for the final rinse. In certain dish washing machines, the articles are passed through an initial rinse compartment before entering the final one. Our invention is adaptable to dish washing machines that have one or two rinse compartments.

The novel means that controls the flow of the final rinse water also includes a mercury switch that is placed within the dish washer. However, the switch is mounted in a tubular housing that has both ends vented to the atmosphere. In this way the switch is protected from the moisture and heat within the machine. Atmospheric air can flow through the housing to maintain the switch at a lower temperature than that which prevails in the machine.

Other objects and advantages will appear in the following specification, and the novel features of the device will be particularly pointed out in the appended claims.

Our invention is illustrated in the accompanying drawings forming a part of this application, in which:

Figure 1 is a longitudinal section taken along the line I—I of Figure 2, and illustrates our invention as controlling the final rinse spray in the washing machine;

Figure 2 is a transverse section taken substantially along the line II—II of Figure 1; and Figure 3 is a transverse section of the portion of the device that houses the mercury switch and is taken along the line III—III of Figure 1.

While we have shown only the preferred form of our invention, it should be understood that various changes or modifications may be made within the scope of the appended claims without departing from the spirit of the invention.

In carrying out our invention, we make use of a dish washing machine, a portion of which is indicated generally at A. This machine is provided with an endless conveyor B and is caused to move in the direction of the arrows 1 and 2 in Figure 1 when a motor or other power source, not shown, is turned on. The endless conveyor B is of the open type so that dishes and other articles carried by the upper reach B1 of the conveyor can be sprayed from the top and bottom for dish washing and rinsing purposes.

We show one type of endless conveyor in the drawings, although we do not wish to be confined to any particular type. The endless conveyor B has a plurality of transversely extending rods 3 and these have plastic sleeves 4 mounted thereon, see Figure 2. The sleeves preferably abut each other on each rod 3 and each link 5 of the conveyor is provided with two sleeves 4 that are spaced apart and parallel each other. The links extend between two adjacent rods 3 that also parallel each other. Figure 1 shows the link 5 as being slightly arcuate in shape so that they will pass around end sprockets, not shown, as the links move from the upper reach B1 of the conveyor to the lower reach B2.

At the ends of the rods 3, we mount supporting rollers 6 and these are designed to travel within supporting channels 7 and 8, or other suitable endless conveyor supporting means. Figure 2 shows the links 5 as being spaced from each other in a transverse direction so that washing or rinsing water can pass through the conveyor in the manner hereinafter described. The sleeves 4 on each rod abut each other and act as spacers for the links 5.

We do not show the washing compartment or the first rinse compartment in the drawings because they form no part of the present invention. One or more rinse compartments may be provided. The washing compartment has a water-receiving tank, not shown, placed below the endless conveyor B. In large commercial dish washing machines, such a tank will hold about thirty gallons of water. The dish washing water is preferably maintained at a temperature of about 140° F. and the tank is provided with an overflow pipe to carry away excess water. A detergent or a soap is mixed with the washing water.

A first rinse compartment which is not illustrated in the drawings, has a second tank, not shown, placed below the endless conveyor B, and this tank also holds approximately thirty gallons of water. Any excess water in this tank will be passed into the first-mentioned tank. The second water holding tank also extends under the final rinse compartment which forms a part of our present invention. The water in the first rinsing compartment is preferably maintained at a temperature of about 160° F. which is somewhat higher in temperature than the dish washing water. The water used in the second or final rinse compartment is preferably at a temperature of about 200° F., and this water is received in the second tank and, as already stated, when the water in this tank exceeds a predetermined level, the excess water will flow on into the dishwashing water-receiving tank.

In commercial dishwashing machines of which we are aware, the final rinse hot water supply is turned on automatically as soon as the endless conveyor B is started in operation. The larger machines are slightly over twelve feet in length and therefore it takes a considerable time for dishes and other articles to travel from the dishwashing compartment, through the first rinse compartment, and then into the final rinse compartment, because the conveyor moves slowly. It will be seen that if the final rinse water is turned on as soon as the endless conveyor is started in its movement, a considerable quantity of hot water will be lost because the only water that is effective is that which will actually strike the dishes or other objects that are being moved by the endless conveyor through the final rinse compartment. This hot water is not reused as is the dishwashing water.

It will be apparent that a large hot water boiler must be used where the dishwashing machine turns on the final rinse water as soon as the endless conveyor B is started moving. This is a drain on the hot water supply which is costly because the temperature of the final rinse water must be maintained at a high point. Furthermore, the excess final rinse water which is not used for rinsing objects, will pass into the second water-receiving tank. This excess water will then flow into the first tank and dilute the dishwashing water and necessitate the addition of soap and detergents so that the dishwashing water will be maintained at the right consistency for dishwashing purposes.

The principal object of our invention is to overcome the waste of the final rinse water and to save in the amount of detergents and soap that must be added because the dishwashing water becomes diluted with the addition of the overflow from the final rinse water. We provide novel means for turning on the final rinse water when a dish or other article reaches the final rinse compartment M, and is ready to be sterilized by the high temperature rinse water.

Referring to Figure 1, it will be seen that we mount a comb indicated generally at C so that the shaft 9 of the comb will extend transversely across the width of the machine, see Figure 2. The ends of the shaft 9 are mounted in bearings 10 and the bearings in turn are supported by brackets 11 that are placed at the sides 12 of the dishwashing machine A. The tines 13 of the comb C are spaced transversely apart as indicated in Figure 2 and extend downwardly and rearwardly at an angle from the shaft 9. The reinforcing rod 14 interconnects all of the tines. The lower ends of the tines 13 are curved in the manner shown at 15 and the curved portions are placed close to the upper reach B1 of the endless conveyor B so that any article such as a dish D will strike one or more times and will swing the comb C about the shaft 9 as a pivot.

It is necessary that the comb C be counterbalanced so that it will not exert too much weight on fragile dishes or other articles that are being washed. Furthermore, the tines 13 of the comb must be small in cross-section and spaced apart a sufficient distance so that the rinse water can freely pass between the tines and the entire dish or other article will be thoroughly rinsed. The tines 13 are therefore made of light but strong metal that is rod-like in shape. These tines are welded or otherwise secured to the shaft 9 in spaced apart relation. We counterbalance the weight of the comb C so that the comb will swing easily when even a small object such as a fork or a knife is carried by the endless conveyor B and is brought into contact with one or more of the tines 13 of the comb.

In Figure 1 we show the counterbalance E for the comb as comprising an upwardly extending support 16 which is welded or otherwise secured to the shaft 9 near one end thereof. A threaded shank 17 is mounted in the free end of the support and when the comb is in normal position, the shank is preferably horizontally disposed. A cylindrical weight 18 has a central bore therein that slidably receives the threaded shank 17. Nuts 19 and 20 are threaded on the shank 17 and bear against opposite ends of the weight for adjusting it along the shank for counterbalancing the comb C to the desired degree. The arrangement is such that when the comb C is free, it will automatically swing into the full line position shown in Figure 1 where the curved portion 15 of the tines 13 will be disposed a slight distance above the links 5 of the upper reach B1 of the endless conveyor B.

The counterbalance E serves an additional function in that it supports a permanent horseshoe magnet F that is disposed adjacent to a mercury switch G. The mercury switch G is arranged in a J-shaped housing H when looking at Figure 3 so that the moisture and the heat within the second rinse compartment will be kept away from the switch. The casing 21 that encloses the horseshoe magnet F forms an integral part of the threaded shank 17 and this casing can be moved toward or away from the housing H in Figure 1 by adjusting nuts 22 that are mounted on the threaded shank and are placed on opposite sides of the upwardly extending support 16.

The mercury switch G is of a type that has a swingable terminal 23 that is moved out of a globule of mercury 24, see Figure 3, when the magnet F is in the position shown in Figure 1. Another terminal 25 in the switch is fixed and has its lower end always in contact with the globule of mercury. It will be seen, therefore, that when the comb C is in normal position and the magnet F is disposed close to the mercury switch G, the swingable terminal 23 will be attracted by the magnet and the switch will remain open.

The switch G is electrically connected to a solenoid-actuated valve J shown in Figure 1. This valve is placed in the hot water line K that leads to spray heads L1 and L2 that are disposed in the final rinse compartment M. When a dish or other article is carried by the upper reach B1 of the endless conveyor and strikes the comb C so as to swing it, the shaft 9 will be rocked in its bearings 10 and will swing the magnet F away from the mercury switch G and permit the switch to close. An electric circuit will be closed when the switch closes and the circuit will open the electric valve J. The opening of the valve J will permit hot water at a temperature around 200° F. to flow through the hot water line K to the upper final rinse head L1, and the lower final rinse head L2. These rinse heads have nozzles 26 and 27, respectively, that will direct final rinse sprays 28 and 29 downwardly and upwardly for rinsing and sterilizing all surfaces of the dish D or other article that is moving through the rinse compartment M.

It will be noted that the final rinse compartment M is bounded on its sides by the walls 12 and is also provided with flexible entrance and exit aprons 30 and 31. The apron 31 closes the greater portion of the exit opening 32 for the dishwashing machine, see Figure 1. The curved portions 15 of the tines 13 are disposed near the first or entrance apron 30 so that as the dish or other article enters the compartment M, the comb C will be swung and will move the magnet F so that the switch G will close and cause the final rinse sprays to strike the surfaces of the object passing through the compartment. We do not wish to be confined to any particular size of rinse compartment M because it may be made larger or smaller than that indicated in Figure 1. As soon as the article being rinsed moves out of contact with the tines 13, the final rinse spray will be immediately cut off because the comb C will return to normal position and the magnet F will again move adjacent to and open the switch G and this will open the electric circuit and permit the valve J to close. A master switch 33 is shown in Figure 1 for the electric circuit that interconnects the mercury switch E with the electrically-controlled valve J.

We provide novel means for keeping the mercury switch G relatively cool and also free from any moisture that is within the dishwashing machine. The housing H shown in Figure 3 has its lower end 34 communicating with an opening in the side wall 12 of the dishwashing machine A. The upper end 35 of the housing communicates with an opening in the top 36 of the dishwashing machine A. Atmospheric air is free to enter the housing in the manner indicated by the arrows 37 in Figure 3 and this will keep the mercury switch G cool enough so that it will operate efficiently for long periods of time.

The lower or entrance opening 34 to the housing H is preferably protected by means of a louvre 38, see Figure 3. The upper or air outlet end 35 of the housing H is protected by means of a box 39 that has perforated walls through which the air can pass. Wires 40 from the mercury switch G can pass from the box 39 to the electrically controlled valve J through a protecting tubing, not shown. The housing H is nonperforated and therefore no moisture within the dishwashing machine can reach the mercury switch.

We claim:

1. In a dishwashing machine: a water pipe leading to the machine for conveying water to the dishes in the machine; an electrically controlled valve mounted in the pipe; a housing mounted in the machine and having inlet and outlet ends extending to the outer surface of the machine; the outlet end being disposed at a higher level than the inlet end; a mercury switch disposed within the housing and being in electrical connection with the valve; said housing protecting the switch from the moisture within the machine and acting as a passage for air to pass therethrough and reduce the temperature of the switch; and dish-actuated magnetic means placed within the machine and adjacent to the switch for closing the switch when a dish contacts with the means and causing the valve to open for permitting water to enter the machine.

2. In a dishwashing machine with automatic final rinse control: a housing defining a final rinse compartment; a conveyor disposed and operable for advancing dishes or the like through the rinsing compartment; spray nozzles located in said compartment in positions for discharging water over the dishes or the like advancing therethrough; a pipe leading from a source of hot water and communicating with the nozzles; a normally closed solenoid valve coupled in this pipe for controlling flow of water therethrough; a swingably-mounted counterbalanced comb arranged in the housing above the conveyor, and defining spaced-apart tines sloping downwardly toward said compartment; the lower ends of these tines being arranged adjacent to the conveyor in positions to be raised by the dishes or the like as they advance through the rinsing compartment; a magnet carried by the comb and movable therewith; and an electrical circuit connected to the solenoid valve, and having a switch provided in the circuit; the switch including a movable terminal normally disposed adjacent to the magnet in a location wherein the field lines of force of the magnet will draw open the switch in the absence of dishes or the like being advanced beneath the tines, thereby allowing the solenoid valve to close and cut off flow of the rinse water; the magnet being mounted to be retracted from the switch when the comb is swung by dishes or the like passing therebeneath, with the magnet being carried to a position wherein its field lines of force will become ineffective in holding the switch open, thereby allowing the switch to close and open the solenoid valve for discharging water over the dishes or the like.

References Cited in the file of this patent

UNITED STATES PATENTS

| | | |
|---|---|---|
| 1,512,918 | Forsgard | Oct. 28, 1924 |
| 2,610,642 | D'Aurora | Sept. 16, 1952 |
| 2,668,548 | Federigh | Feb. 9, 1954 |